UNITED STATES PATENT OFFICE.

N. C. RAYMOND, OF AUSTIN, TEXAS.

IMPROVEMENT IN COMPOSITIONS USED AS BUILDING MATERIALS.

Specification forming part of Letters Patent No. 21,778, dated October 12, 1858.

*To all whom it may concern:*

Be it known that I, N. C. RAYMOND, of the city of Austin, in the county of Travis, in the State of Texas, have discovered a new and useful Composition of Matter for Building and Fencing Purposes; and I do hereby declare that the following is a full and exact description thereof.

The nature of my invention consists in the production or formation of a material for building purposes in the shape of an unburned brick, solid and durable, and possessing the power or quality of being unaffected by rain as soon as the drying process fairly begins.

To enable others to make and use the composition, I will proceed to describe it.

As the most applicable name, I have called it "Lithocolla Concreta," indurating stone-glue or concrete-cement, formed by an application of the following substances to the common clays or soils of the country, to wit: of quicklime, twenty-eight (28) parts; of pulverized or powdered charcoal, six (6) parts; of clay or soil, (unburned,) forty-nine (49) parts; of pasture-fed-cow dung, powdered, seventeen (17) parts; or of slaked lime, thirty-seven (37) parts; of pulverized or powdered charcoal, six (6) parts; of clay or soil, (unburned,) fifty-seven (57) parts. Mix to the consistence required for mortar with a strong solution of pasture-fed-cow dung. I mold it into blocks of any required size, or use it for building or fencing purposes, in the same way that the common gravel or concrete wall is built, or as a substitute for the common lime-and-sand mortar. The cow-dung renders the composition impervious to the action of any ordinary rain as soon as the drying process begins.

What I claim as my invention, and desire to secure by Letters Patent, is—

The application of pasture-fed-cow dung, either in substance or solution, together with lime, either slaked or unslaked, or other powerful alkaline substance, and charcoal to the common clays or soils of the country, for the purpose of producing a building material, substantially as described.

N. C. RAYMOND.

Witnesses:
J. W. LATIMER,
W. K. MASTEN.